US006897762B2

(12) United States Patent
Howells

(10) Patent No.: US 6,897,762 B2
(45) Date of Patent: May 24, 2005

(54) VEHICLE IMMOBILIZATION SYSTEM

(76) Inventor: Donald Glanmor Howells, 63 Manor Road, Rushden, Northomptonshire, NN10 9EX (GB)

( * ) Notice: Subject to any disclaimer, the term of this patent is extended or adjusted under 35 U.S.C. 154(b) by 339 days.

(21) Appl. No.: 09/879,541

(22) Filed: Jun. 12, 2001

(65) Prior Publication Data

US 2002/0067248 A1 Jun. 6, 2002

Related U.S. Application Data

(63) Continuation-in-part of application No. PCT/GB99/04132, filed on Dec. 9, 1999.

(30) Foreign Application Priority Data

Dec. 12, 1998 (GB) ............................................. 9827362
Sep. 21, 1999 (GB) ............................................. 9922166

(51) Int. Cl.[7] ........................... H04Q 1/00; G06K 19/00; B60R 25/00; G08C 19/00; H01Q 1/32
(52) U.S. Cl. .................... 340/5.31; 340/5.64; 340/5.72; 340/5.31; 340/825.69; 343/711
(58) Field of Search ........................... 340/5.31, 825.69, 340/5.64, 5.72, 825.72; 343/711

(56) References Cited

U.S. PATENT DOCUMENTS 4,660,528 A    4/1987  Buck
4,878,050 A   10/1989  Kelley
5,276,728 A    1/1994  Pagliaroli
5,675,490 A *  10/1997 Bachhuber .................... 701/32
5,933,075 A    8/1999  Ditson
6,496,100 B1 * 12/2002 Hiebl ......................... 340/5.31

FOREIGN PATENT DOCUMENTS

GB           2305216      5/1954
WO        WO 98/30421     7/1998

* cited by examiner

Primary Examiner—Michael Horabik
Assistant Examiner—Kimberly Hamilton
(74) Attorney, Agent, or Firm—Edwin D. Schindler

(57) ABSTRACT

An immobilization system for a vehicle for assisting law enforcement includes a first remote control device, which transmits a predetermined wireless control signal, and a second remote control device, which includes a first directional antenna for transmitting a selectable wireless control signal in a first direction and a second directional antenna for transmitting a wireless enable signal in a second direction. The second remote control device includes an externally operable device for selecting the wireless control signal and the enable signal to be transmitted. A receiver is included for receiving the control signal and the enable signal with the predetermined control signal being substantially unique to the receiver. A device for disabling a vehicle by police, in response to either the predetermined control signal or the selectable control signal, is provided for allowing capture of those assailants seeking to escape by use of a motor vehicle.

11 Claims, 3 Drawing Sheets

VEHICLE IMMOBILIZATION SYSTEM

CROSS REFERENCE TO RELATED APPLICATION

This application is a continuation-in-part of International Patent Application PCT/GB99/04132, filed Dec. 9, 1999.

BACKGROUND OF THE INVENTION

1. Field of the Invention

This invention relates to a vehicle immobilization system.

2. Description of the Prior Art

Vehicle thefts and joy-riding are commonplace nowadays. Typically, the most conventional way adopted by the police of stopping a stolen vehicle is either by pursuing it or by placing a device on the road, which punctures the vehicle's tires.

Both of the above-mentioned methods of stopping stolen vehicles are unsatisfactory, since they generally involve dangerous pursuits at high speeds.

It has been proposed to overcome the above-mentioned problem by providing a system for remotely disabling a vehicles engine. One such device is disclosed in U.S. Pat No. 5,276,728, which comprises a first remote control device having means for transmitting a predetermined wireless control signal, a second remote control device also having means for transmitting the predetermined wireless control signal, and a vehicle unit having a receiver for receiving the control signals and means for disabling and enabling the vehicle in response to either of the control signals.

In use the first remote control device is carried by the vehicle's owner and is used to enable and disable the vehicle upon leaving and returning to the vehicle. The second remote control device is carried by the police and can be used to disable the vehicle if it is stolen After the disabled vehicle has been recovered, the police are able to enable the vehicle.

A disadvantage of the above-mentioned system is that the police need to know the appropriate code in order to disable a stolen vehicle and this is often difficult to obtain, at least within a reasonable time. It may be possible to obtain these details from a database by entering the vehicle's license plate number. However, stolen vehicles often have forged plates bearing a false number.

SUMMARY OF THE INVENTION

The present invention therefore provides, as seen from one aspect, a vehicle immobilization system in which the second remote control device used by the police comprises externally operable means for entering the type (e.g. the make or model) of the stolen vehicle and for selecting the control signal to be transmitted from the entered type, In this manner the police are instantaneously able to disable an identified vehicle.

In order to overcome the problem of inadvertently disabling innocent vehicles of the same make, the present invention also provides an immobilization system for a vehicle in which the second remote control device used by the police comprises means for respectively transmitting directional signals which respectively enable and disable vehicles.

Thus, any innocent vehicles which are inadvertently disabled can be enabled. In a preferred embodiment, the aerial transmitting the disabling signal is mounted to transmit the signal forwardly from a police vehicle, in order to disable a vehicle which it is pursuing. The aerial transmitting the enabling signal is mounted to transmit the signal rearwardly from the police vehicle, in order to enable any innocent vehicles which it passes that have been inadvertently disabled.

BRIEF DESCRIPTION OF THE DRAWINGS

An embodiment of this invention will now be described by way of example only and with reference to the accompanying drawing, in which.

DESCRIPTION OF THE EMBODIMENT SHOWN IN THE DRAWINGS

Figure 1:
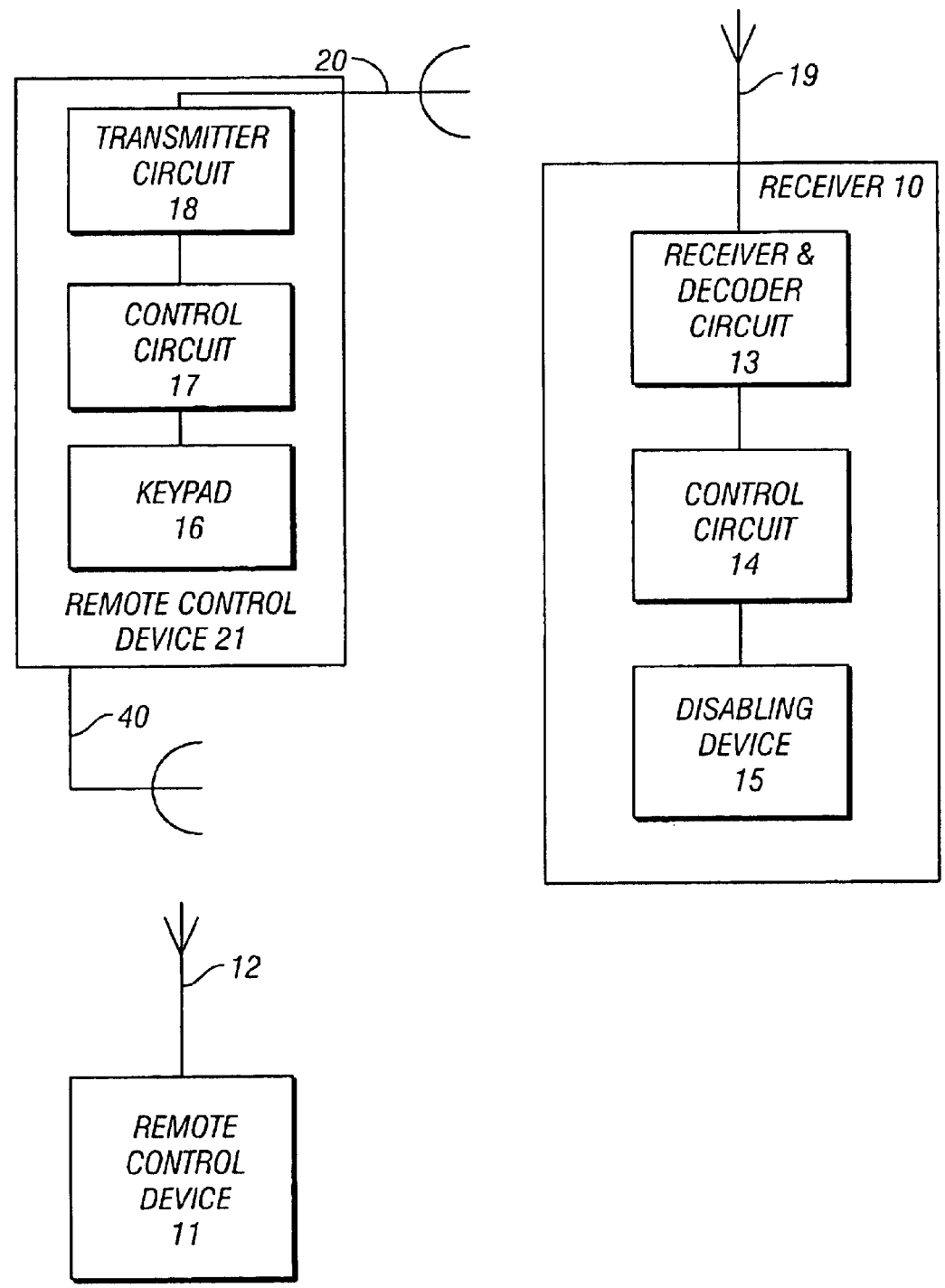
FIG. 1 is a block diagram of a vehicle immobilization system in accordance with this invention.

Referring to FIG. 1 of the drawings, there is shown a vehicle immobilization system comprising a receiver 10 for mounting in a vehicle, and one or more first remote devices, e.g. 11, which are kept by the vehicle's owner for enabling and disabling the vehicle.

The system may be fitted in a vehicle from new, alternatively it may be fitted to an existing vehicle as an accessory. The first remote control device 11 comprises a transmitter which is connected to an aerial 12. The first remote control device 11 transmits a coded control signal when an actuator thereon is actuated.

The receiver 10 is normally mounted under the bonnet of the vehicle and a small aerial 19 is provided for receiving wireless control signals from the first remote control device 11. The aerial 19 is connected to a circuit 13, which receives and decodes any signals that are received. The decoded signal is then passed to a control circuit 14, which verifies that the received code corresponds with a predetermined code, which is substantially unique to the vehicle.

If a valid code is received, the control circuit 14 changes the state of a device 15 which disables the vehicle, say by inhibiting the vehicle's ignition or engine management system.

It will be appreciated that the system as hereinbefore described is the same as a conventional vehicle immobilization system and the first remote control device 11 can be used by the person in charge of the vehicle to disable the vehicle when it is left and to enable it upon return to the vehicle.

However, in accordance with this invention, the receiver 10 is also arranged to respond to control signals transmitted from a second remote control device 21 kept and operated by the police.

Figure 2:
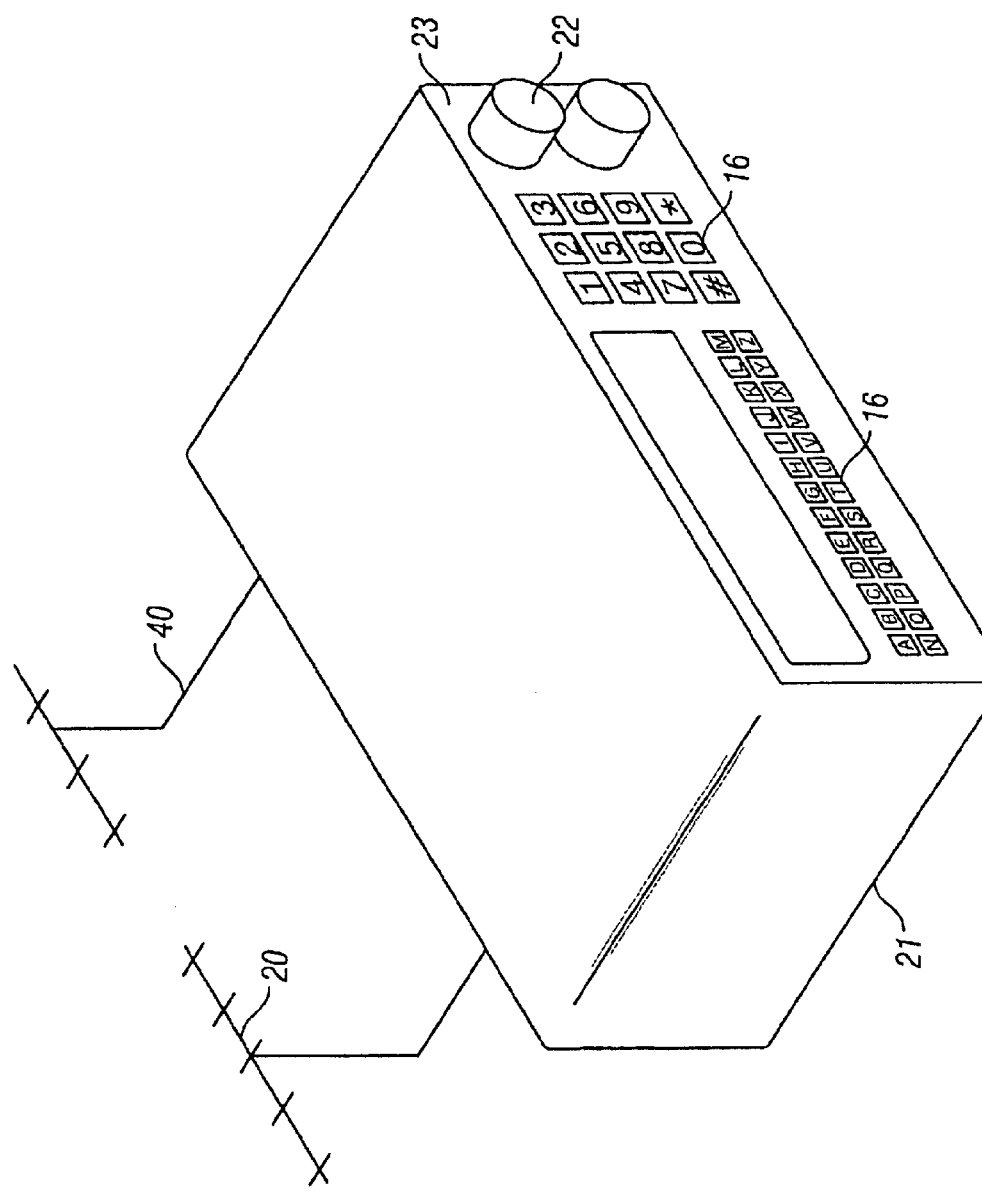
FIG. 2 is a perspective view of a remote device of the system of FIG. 1, for installing in a police vehicle.

Referring to FIG. 2 of the drawings, the second remote control 21 comprises housing 23 for mounting in a police vehicle. Alternatively, the second remote control device 21 may be a portable unit for use on the roadside. The housing 23 comprises a front panel having a plurality of alpha-numeric keys 16, which can be used to enter the type (e.g., the make or model) of the vehicle to be stopped. The housing 23 is connected to two aerials 20, 40, both of which are directional. In a preferred embodiment, the aerials 20, 40 are respectively mounted to transmit forwardly and rearwardly from a police vehicle.

Referring again to FIG. 1 of the drawings, the keys 16 on the front of the housing 23 are connected to a control circuit 17, which determines the formats of the enabling and disabling signals that are appropriate to the identified vehicle.

The control circuit 17 may comprise a database, which provides details of the required code formats, once the registration number, make or model of the vehicle has been entered. Alternatively, the control circuit 17 may be arranged to obtain the details via radio link from a police database or the like. In a further embodiment, the code formats of the signals to be transmitted can be input manually, once the operator has determined the correct formats over the radio from police headquarters.

The selected code formats to be transmitted are fed to a transmitter circuit 18, which modulates the codes onto respective high frequency radio carrier waves. The output power of the transmitter circuit 18 is, preferably, much greater than the output power of the transmitter of the conventional remote control device 11.

The normal codes that need to be transmitted from the first remote device 11 to disable and enable the vehicle are quite complex and often change each time the vehicle is disabled. Thus, the second remote device 21 may transmit a master code, which is different from the normal code, the receiver 10 bring arranged to respond to either the normal code or the master code.

This master code can be unique to the vehicle, to the make of vehicle or to the model of vehicle. In the latter two cases, the directional aerial 20 on the second remote device 21 helps to ensure that adjacent vehicles of the same make or model are not also disabled when the second remote device 21 is activated.

Figure 3:
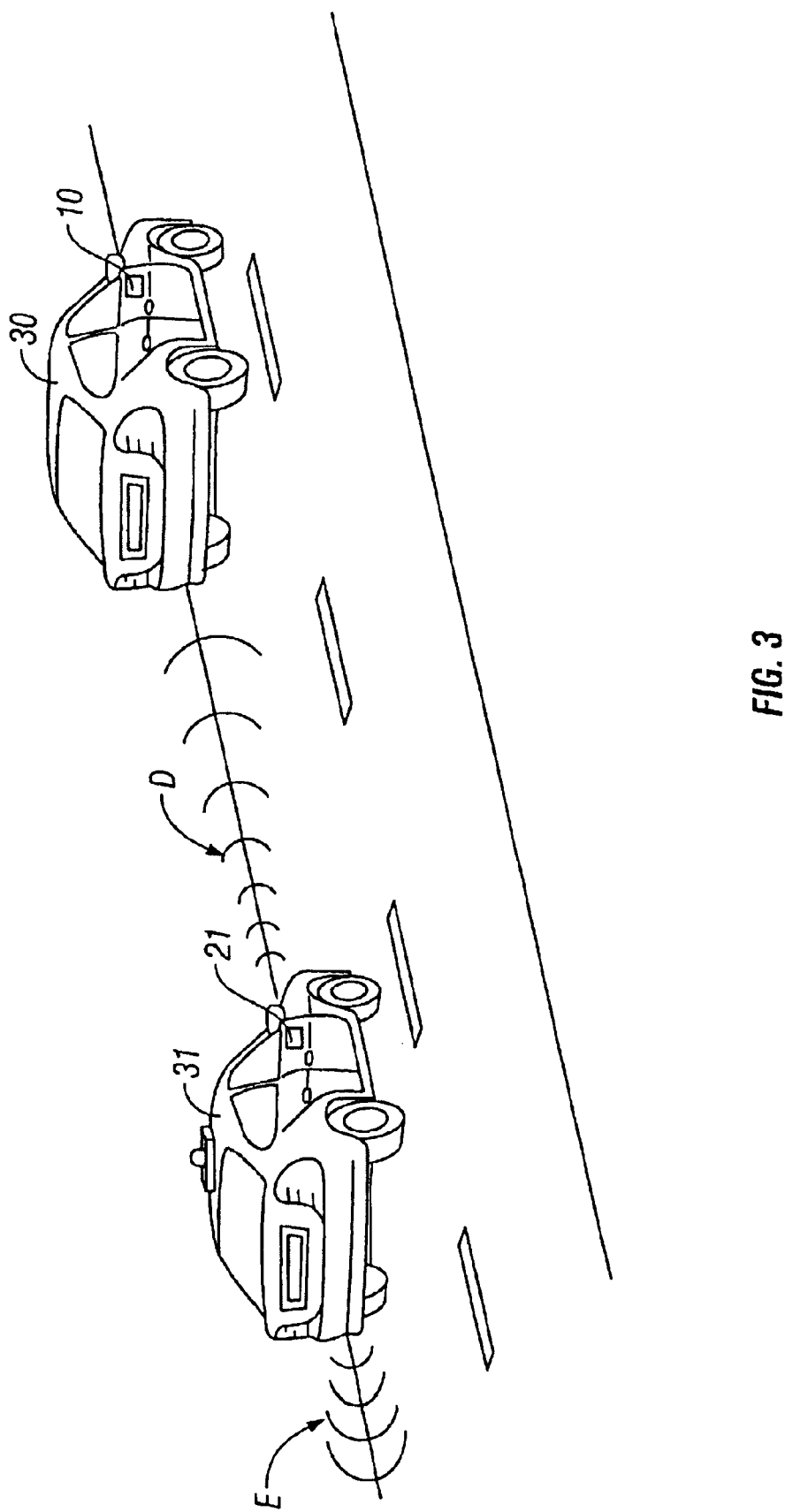
FIG. 3 is a perspective view of the system of FIG. 1 being used to stop a vehicle.

Referring to FIG. 3 of the drawings, once the identity of the stolen vehicle 30 has been entered into the second remote device 21 in the police vehicle 31, the stolen vehicle 30 can be disabled by pursuing it in the police vehicle 31 and actuating a switch 22 (FIG. 2) on the second remote device 21 to cause a directional disabling signal D to be transmitted to the stolen vehicle 30. The power of the transmitted disabling signal D is sufficient to reach the receiver 10 in the stolen vehicle 30 from a distance of 50 meters or more.

When the receiver 10 in the stolen vehicle receives the signal D from the second remote device 21 in the police vehicle 31, the stolen vehicle 30 is partially disabled, so that it gradually loses power, thereby enabling the driver to be apprehended safely, without any need for a prolonged high speed pursuit.

The second remote device 21 in the police vehicle 31 also transmits an enabling signal E rearwardly via the directional aerial 40, so that any innocent vehicles that are unintentionally disabled are automatically enabled as the police vehicle 31 passes them by.

Preferably, a vehicle which has been disabled by the police cannot be enabled using the first remote control device 11. Thus, a thief in possession of such a device cannot enable a vehicle which has been disabled by the police.

It should be understood that the embodiment described herein is merely exemplary and that a person skilled in the art may make variations and modifications without departing from the spirit and scope of the invention.

I claim:

1. An immobilization system for a vehicle, comprising:
   a first remote control device including means for transmitting a predetermined wireless control signal;
   a second remote control device including a first directional antenna for transmitting a selectable wireless control signal in a first direction, a second directional antenna for transmitting a wireless enable signal in a second direction, said second direction being different from said first direction, and externally operable means for selecting said selectable wireless control signal and said wireless enable signal to be transmitted;
   a receiver for receiving said selectable wireless control signal and said wireless enable signal, said predetermined wireless control signal being substantially unique to said receiver;
   means for disabling a vehicle in response to either said predetermined wireless control signal or said selectable wireless control signal; and,
   means for enabling the vehicle in response to said wireless enable signal.

2. The immobilization system for a vehicle according to claim 1, wherein said externally operable means includes a device for entering a vehicle's registration number and means for selecting said selectable wireless control signal and said wireless enable signal to be transmitted from the vehicle's registration number.

3. The immobilization system for a vehicle according to claim 1, wherein said externally operable means includes a device for entering a make of the vehicle and means for selecting the selectable wireless control signal and said wireless enable signal to be transmitted from the make of the vehicle.

4. The immobilization system for a vehicle according to claim 1, wherein said externally operable means includes a device for entering a model of the vehicle and means for selecting the selectable wireless control signal and said wireless enable signal to be transmitted from the model of the vehicle.

5. The immobilization system for a vehicle according to claim 1, wherein said means for enabling a previously disabled vehicle is in response to said predetermined wireless control signal.

6. The immobilization system for a vehicle according to claim 1, wherein said means for enabling a vehicle prevents enablement of a previously disabled vehicle in response to said predetermined wireless control signal following disablement in response to said selectable wireless control signal.

7. The immobilization system for a vehicle according to claim 1, wherein said selectable wireless control signal and said wireless enable signal transmitted by said second remote control device have a substantial greater power than said predetermined wireless control signal of said first remote control device.

8. The immobilization system for a vehicle according to claim 1, wherein said means for disabling is operable for partially disabling the vehicle in response to said selectable wireless control signal.

9. The immobilization system for a vehicle according to claim 8, wherein said second remote control device including means for selecting a degree to which said means for disabling the vehicle partially disables the vehicle.

10. An immobilization system for a vehicle, comprising:
    a first remote control device including means for transmitting a predetermined wireless control signal;
    a second remote control device including means for transmitting a selectable wireless control signal and externally operable means for entering a make or model of a vehicle to be immobilized;

means for obtaining said selectable wireless control signal to be transmitted from said make or model of the vehicle; and, a vehicle unit comprising:

a receiver for receiving said predetermined wireless control signal and said selectable wireless control signal, said predetermined wireless control signal being substantially unique to said receiver; and, means for disabling said vehicle in response to either said predetermined wireless control signal or said selectable wireless control signal.

11. The immobilization system for a vehicle according to claim 10, wherein said second remote control device includes means for transmitting a selectable enable signal and means for selecting said selectable wireless control signal to be transmitted from said make or model of said vehicle, so entered, said vehicle unit having means for enabling the vehicle in response to said selectable enable signal.

* * * * *